Jan. 22, 1957    T. F. KLEM ET AL    2,778,649
DIAPHRAGM CHUCK
Filed May 10, 1954    2 Sheets-Sheet 1

INVENTORS
THEODORE F. KLEM
CHARLES H. SATTERLEE
BY
*Richard W. Treverton*
ATTORNEY Jan. 22, 1957     T. F. KLEM ET AL     2,778,649
DIAPHRAGM CHUCK Filed May 10, 1954     2 Sheets-Sheet 2

*INVENTORS*
THEODORE F. KLEM
CHARLES H. SATTERLEE

BY *Richard W. Treverton*
ATTORNEY

United States Patent Office 2,778,649
Patented Jan. 22, 1957

2,778,649

DIAPHRAGM CHUCK

Theodore F. Klem, Webster, and Charles H. Satterlee, Rochester, N. Y., assignors to The Gleason Works, Rochester, N. Y., a corporation of New York Application May 10, 1954, Serial No. 428,717

12 Claims. (Cl. 279—46)

The present invention relates to a chuck of the type having work-clamping jaws carried by a resilient diaphragm which is flexed from its neutral position to chuck a workpiece and is allowed to return to neutral position for dechucking. A primary object of the invention is to provide in such a chuck a positive and automatically operating means to draw the workpiece against the face of the chuck at the initiation of the chucking action.

According to the invention the diaphragm has a central opening through which extends an actuator that is slidable axially in the chuck body in one direction, rearwardly, to effect chucking, and in the opposite direction, forwardly, for dechucking. The actuator is so related to the diaphragm that during its motion rearwardly from a neutral position it flexes the diaphragm in a direction to chuck the work, while during its motion forward of such neutral position it moves free of the diaphragm. For drawing the work against the face of the chuck there is a work-engaging clamp member detachably connected to a draw rod that is slidable axially in the actuator, and a spring for urging the draw rod rearwardly with respect to the actuator. With this arrangement, during the initial rearward motion of the actuator, from its most forward position in which the spring load on the draw rod is released, the spring and the draw rod are first moved rearwardly to draw the workpiece against the face of the chuck under spring pressure, and then, during a continuation of the rearward motion of the actuator, the diaphragm is flexed to cause the jaws to clamp the work.

The foregoing and other objects and advantages of the invention will appear from the following description made with reference to the accompanying drawings, wherein.

Figures 1, 2:
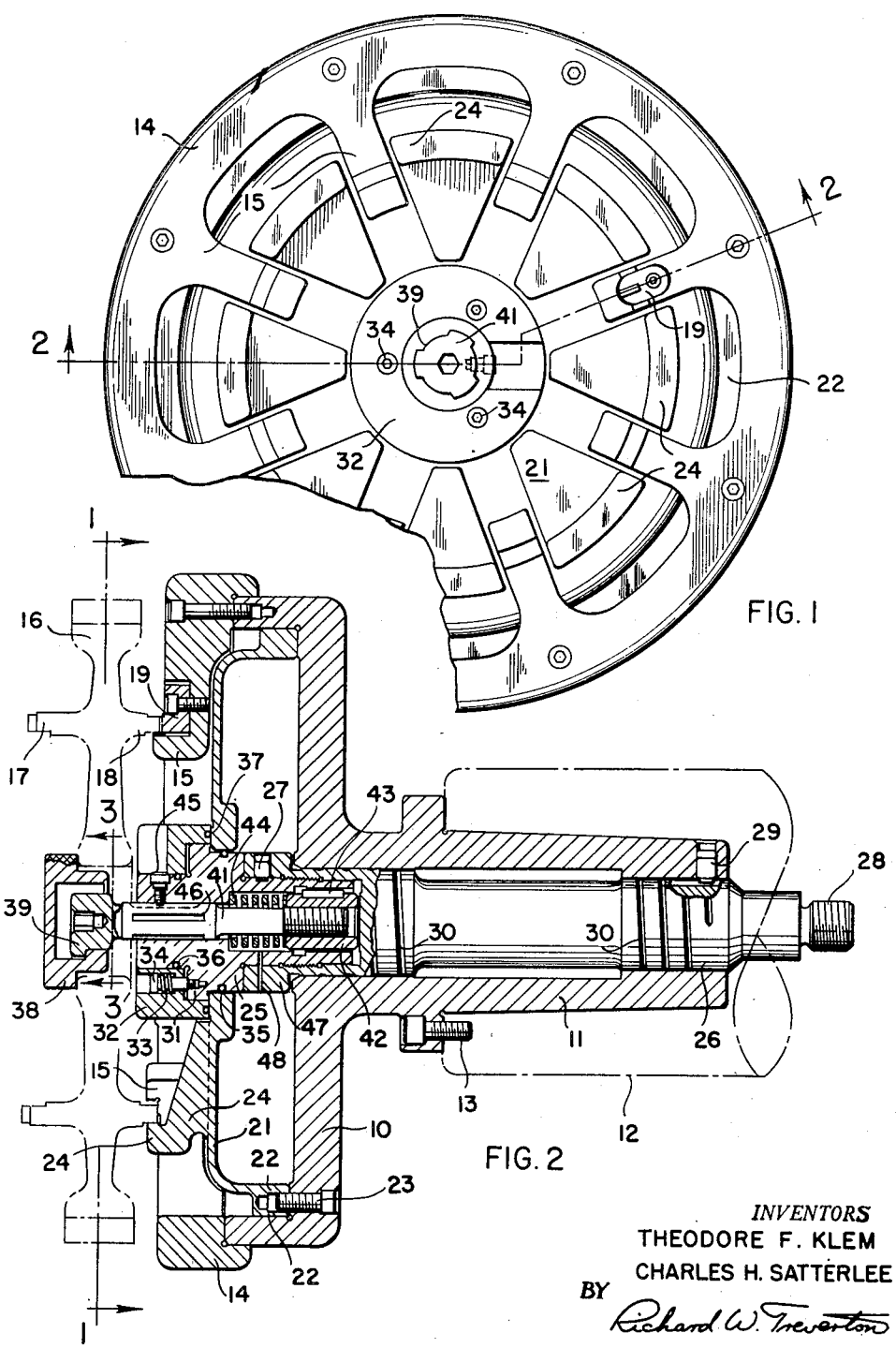
Fig. 1 is a front view of a chuck whose jaws contract to clamp the work.
Fig. 2 is an axial sectional view in the planes indicated at 2—2 in Fig. 1.

The body of the chuck shown in Figs. 1 and 2 comprises a rear section 10 having a tapered shank 11 adapted to fit a machine spindle 12, such for example as the spindle of a clutch tooth grinding machine, and to be secured thereto by a plurality of screws one of which is shown at 13. The chuck body further comprises a forward section 14 secured to the rear section 10 by screws, as shown, and having inwardly and thence forwardly extending arms 15 adapted to seat a workpiece 16. The workpiece shown is a turbine rotor disc whose annular flange 17 is to have face clutch teeth ground in its forward face and whose opposite annular flange 18 is to be clamped in the chuck. This flange 18 has a keyway in which is engaged a key 19 that is secured to one of the arms 15. In the event clutch teeth have previously been cut in flange 18, the key 19 may be replaced with one which is complementary to one of the inter-tooth spaces.

A flexible diaphragm 21 is secured at its periphery to the body section 10, the diaphragm for this purpose having a relatively heavy outer rim 22 into which screws 23 are threaded. On the web of the diaphragm are integral jaws 24 which are adapted to move radially inwardly to clamp the workpiece when the diaphragm is flexed rearwardly, i. e. to the right in Fig. 2. Slidable in an axial bore in the body section 10 is an actuator comprising telescoping front and rear parts, 25 and 26 respectively, secured together by a screw 27. The rear part 26 is screw-threaded at 28 for connection to the piston rod, or an extension thereof, of a hydraulic piston and cylinder unit (not shown) mounted on the end of machine spindle 12 opposite from the chuck. A key 29 engaging in a keyway in the actuator prevents the actuator from rotating in the chuck body. The bearing surfaces of part 26, which slide in the bore of body 10, preferably have lubricant distributing grooves 30.

The front part 25 of the actuator extends through a central bore through the diaphragm, and has an abutment in the form of flange 31 engageable with the front face of the diaphragm. Telescoped over and slidable axially on part 25 is a sealing ring 32 which is pressed against the front face of the diaphragm by light springs 33 supported by studs 34 that are anchored in part 25. Flexible seals 35, 36 and 37 of the O-ring type are arranged between the parts 21, 25 and 32 to exclude foreign matter from interior of the chuck.

For drawing the workpiece 16 tightly against the arms 15, a clamp member 38 (not shown in Fig. 1) is detachably connected, preferably by a bayonet joint 39, to a draw rod 41 that is slidable in an axial bore through actuator part 25. A nut 42 screw-threaded to the rod is free to move axially of the actuator but is held against turning by means of a key 43. Confined between the actuator and the nut is a coiled compression spring 44. The rod 41 is held against rotation relative to the actuator and the nut by a key 45 which is screw-threaded to part 25 and may engage in any one of several keyways 46 disposed around the rod, the key being backed off to permit adjustment of the rod in the nut. This adjustment is preferably such that when a workpiece is supported on arms 15 the clamp member 38 can be manually connected to or disconnected from the rod with little or no compression of spring 44 when the actuator is in its forward limit position. In this position, which is determined by the stroke of the hydraulic piston to which reference has previously been made, the flange 31 of the actuator is spaced from the diaphragm, but the ring 32 or its seal 37 is held in contact with the diaphragm by the action of springs 33. As shown in Fig. 2 a vent 48 extends through the wall of the actuator part 25 and flange 47 between the chamber containing spring 44 and the chamber behind diaphragm 21.

In chucking, the workpiece is first placed on the forwardly projecting portions of arms 15 and in proper engagement with key 19 while the actuator is in its forward limit position. The clamp member 38 is connected to draw rod 41 and then the hydraulic unit is operated to draw the actuator rearwardly. During the initial part of this rearward stroke, the spring 44 is compressed enough to draw the workpiece tightly against the forwardly facing work-seating surfaces of arms 15, and during the latter part of the stroke the flange 31 abuts and flexes the diaphragm rearwardly, causing the jaws 24 to clamp the work. Flange 47 is adapted to abut the body section 10 to limit the chucking stroke of the actuator, to prevent excessive flexure of the diaphragm in case an undersize workpiece or no workpiece at all is between the jaws 24.

To dechuck, the hydraulic piston is caused to move the actuator forwardly, allowing the diaphragm to return to its normal, unflexed condition wherein the jaws 24 are free of the workpiece. During this stroke of the actuator, after the latter has reached its neutral position, it moves free of the diaphragm to its forward limit position wherein the pressure of spring 44 is relieved sufficiently to enable the clamp member 38 to be manually detached from the rod 41. The term "neutral position" is used in this description and in the appended claims to mean the position wherein the actuator is in its limit rearward position wherein there is no flexing the diaphragm. With reference to Fig. 2, this is the position wherein the flange 31 of the actuator contacts but does not flex the diaphragm.

Figure 5:
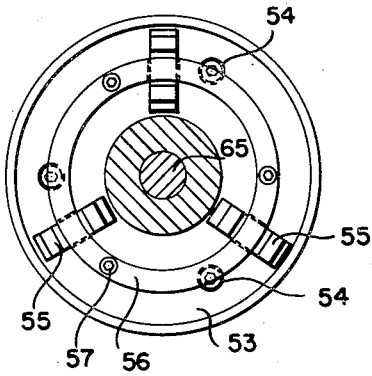
Fig. 5 is a detail cross-sectional view taken in the plane indicated at 5—5 in Fig. 4.
Figure 4:
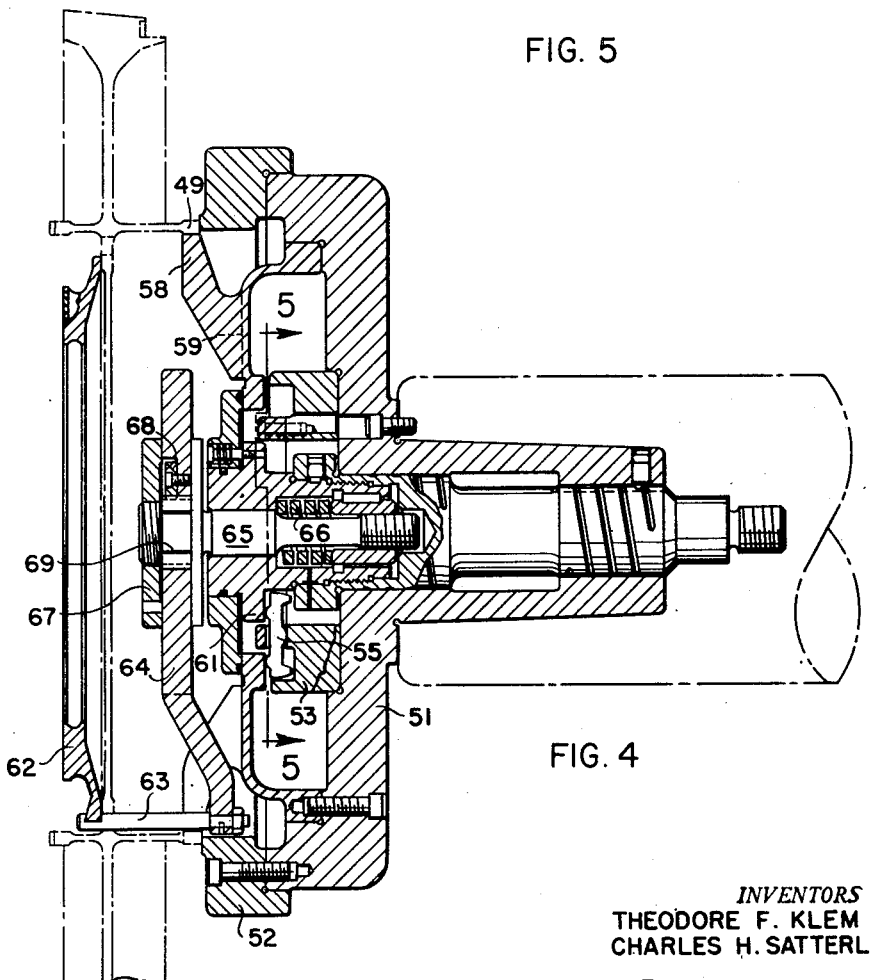
Fig. 4 is a view similar to Fig. 2 through a modified form of chuck whose jaws expand to clamp the work.

In the modification shown in Figs. 4 and 5, the chuck body comprises a rear section 51 and a front ring section 52 which directly seats the front hub 49 of workpiece. The chuck body further comprises a ring 53 secured to section 51 by screws 54. Upon ring 53 are fulcrumed rocker-like levers 55 which are disposed radially of the chuck axis and are retained in radial slots in a ring 56 that is secured to ring 53 by screws 57. The function of the levers is to flex the diaphragm 59 in a forward direction upon rearward motion of the actuator, this being necessary since in this case the jaws 58 on the diaphragm must move radially outwardly to grip an internal surface of the workpiece hub 49. The outer end portion of the levers engage the inner rim of the diaphragm while their inner end portions are engaged by flange 61 of the actuator when the latter moves rearwardly in the body from its neutral position.

In the operation of the modified form of chuck, before the jaws 58 grip the workpiece hub 49 the latter is firmly pressed against the front face of section 51 by a clamp assembly comprising clamp plate 62, pins 63, spider 64, draw rod 65 and coil spring 66. The spring, functioning in the same manner as spring 44 hereinbefore described and likewise acting on a nut threaded to the draw rod 65, draws the clamp assembly rearwardly upon the initial rearward motion of the actuator from its most forward position. The spider, having as many arms as there are pins 63, has its hub secured to draw rod 65 by nut 67. The position of the spider about the axis of the draw rod is determined by the entry of a key 68 in one of several keyways 69 on the rod. Each of the pins 63, only one of which is shown in Fig. 4, has a recess engaging the peripheral flange of clamp plate 62. The latter has notches which may be brought into registry with the pins by rotation of the plate to permit its disengagement from the pins, the arrangement being similar in operation to that of the bayonet joint 39 shown in Figs. 1 to 3.

Figure 3:
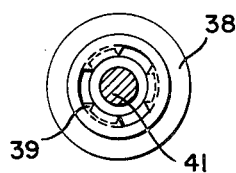
Fig. 3 is a cross-sectional view in the plane designated 3—3 in Fig. 2.

It will be understood that the chuck shown in Figs. 4 and 5 operates in essentially the same manner as the chuck shown in Figs. 1 to 3, with the single difference that the diaphragm is flexed forwardly instead of rearwardly upon rearward motion of the actuator from its neutral position.

Having now described the preferred embodiments of our invention, what we claim is:

1. A chuck comprising a body having a front face adapted to seat a workpiece, a resilient diaphragm secured at its periphery to the body and having a central opening, jaws on the diaphragm for clamping the workpiece with radial pressure, an actuator slidable in the body and extending axially through said opening, the actuator coacting with the diaphragm to flex the latter and thereby effect clamping motion of the jaws when the actuator is moved rearwardly in the body from a neutral position, the actuator being movable forwardly of said neutral position free of the diaphragm, means including a draw rod extending axially through the actuator for drawing the work against the front face of the body, the actuator cooperating with said means to release the pressure thereof on the work upon forward motion of the actuator from said neutral position.

2. A chuck according to claim 1 having a sealing ring slidable axially upon the actuator and resilient means acting between the actuator and the ring for holding the latter against the front face of the diaphragm.

3. A chuck according to claim 1 in which the jaws on the diaphragm are arranged to clamp upon an external surface of a workpiece and the actuator is arranged to abut and flex the diaphragm upon rearward motion from said neutral position, to thereby effect said clamping motion of the jaws.

4. A chuck according to claim 1 in which the means for drawing the work against the front face of the body includes a spring acting between the draw rod and the actuator.

5. A chuck according to claim 4 in which the means for drawing the work against the front face further comprises a clamp member detachably connected to the draw rod and adapted to engage the workpiece.

6. A chuck according to claim 4 in which the draw rod is slidable in an axial bore in the actuator; in which there are a nut screw-threaded to the draw rod, means for holding the nut against rotation relative to the actuator, and releasable means for holding the draw rod against rotation in the actuator; and in which the spring is confined between the actuator and the nut.

7. A chuck according to claim 1 in which the jaws on the diaphragm are arranged to clamp upon an internal surface of a workpiece and lever means are arranged between the actuator and the diaphragm to flex the latter forwardly, to thereby effect said clamping motion of the jaws, upon rearward motion of the actuator from said neutral position, said lever means being fulcrumed upon the chuck body.

8. A chuck according to claim 7 in which said lever means comprise a plurality of levers disposed radially about the chuck axis and fulcrumed intermediate of their ends upon the chuck body for pivot motion each about an axis perpendicular to the chuck axis, outer end portions of the levers being engageable with the diaphragm and inner end portions of the levers being engageable with the actuator.

9. A chuck comprising a body adapted to seat a workpiece, a resilient diaphragm secured at its periphery to the body and having a central bore, jaws on the diaphragm for clamping the workpiece with radial pressure, an actuator slidably axially in the body and in the bore of the diaphragm, the actuator having an abutment for engaging the forward face of the diaphragm, a sealing ring around the actuator, said ring being slidable axially upon the actuator, spring means acting between the actuator and the ring to hold the latter against the forward face of the diaphragm, a draw rod slidable in an axial bore in the actuator, a workpiece-engaging clamp member detachably secured to the rod, a nut screw-threaded to the rod and constrained against rotation relative to the actuator, a coil spring around the rod confined between the actuator and the nut for urging rearward motion of the latter, and releasable means for holding the rod against rotation relative to the actuator.

10. A chuck comprising a body adapted to seat a workpiece, a resilient diaphragm secured at its periphery to the body, jaws on the diaphragm for clamping the workpiece with radial pressure, an actuator slidable axially in the body, and lever means arranged between the actuator and the diaphragm and fulcrumed on the body for flexing the diaphragm forwardly when the actuator is moved rearwardly from a neutral position.

11. A chuck according to claim 10 in which the diaphragm has a central bore through which the actuator extends, and in which there is a draw rod slidable in an axial bore in the actuator, a workpiece-engaging clamp member detachably secured to the rod, a nut screw-threaded to the rod and constrained against rotation relative to the actuator, a coil spring around the rod confined between the actuator and the nut for urging rearward motion of the latter, and releasable means for holding the rod against rotation relative to the actuator.

12. A chuck comprising a body having a front face adapted to seat a workpiece, jaws flexibly connected to a peripheral portion of the body and adapted for clamping the workpiece with radial pressure upon being flexed rearwardly relative to the body, an actuator slidable axially in said body and arranged to coact with the jaws to flex them rearwardly and thereby effect clamping motion of them when the actuator is moved rearwardly in the body from a neutral position, the actuator being movable forwardly from said neutral position free of the jaws, and means including a member engageable by the actuator for exerting pressure on the work for drawing it against the front face of the body, the actuator upon forward motion from said neutral position cooperating with said member to release the pressure exerted by said means.

References Cited in the file of this patent
UNITED STATES PATENTS

| | | |
|---|---|---|
| 2,403,599 | Hohwart et al. | July 9, 1946 |
| 2,473,380 | Ljunggren et al. | June 14, 1949 |